(12) United States Patent
Yadav

(10) Patent No.: US 7,448,067 B2
(45) Date of Patent: Nov. 4, 2008

(54) METHOD AND APPARATUS FOR ENFORCING NETWORK SECURITY POLICIES

(75) Inventor: Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 880 days.

(21) Appl. No.: 10/261,828

(22) Filed: Sep. 30, 2002

(65) Prior Publication Data

US 2004/0064727 A1   Apr. 1, 2004

(51) Int. Cl.
*H04L 29/00* (2006.01)
(52) U.S. Cl. .......... 726/1; 726/6; 726/12; 726/25; 726/26; 726/34; 713/150; 709/223
(58) Field of Classification Search .......... 713/150; 726/6, 12, 34, 26, 25, 1; 709/223
See application file for complete search history.

(56) References Cited

U.S. PATENT DOCUMENTS

| | | | | |
|---|---|---|---|---|
| 5,751,967 A * | 5/1998 | Raab et al. | ........... | 709/228 |
| 5,903,732 A * | 5/1999 | Reed et al. | ........... | 709/229 |
| 5,987,611 A * | 11/1999 | Freund | ........... | 726/4 |
| 6,088,804 A * | 7/2000 | Hill et al. | ........... | 726/25 |
| 6,289,462 B1 * | 9/2001 | McNabb et al. | ........... | 726/21 |
| 6,298,445 B1 * | 10/2001 | Shostack et al. | ........... | 726/25 |
| 6,393,474 B1 * | 5/2002 | Eichert et al. | ........... | 709/223 |
| 6,477,651 B1 * | 11/2002 | Teal | ........... | 726/23 |
| 6,530,024 B1 * | 3/2003 | Proctor | ........... | 726/23 |
| 6,539,427 B1 * | 3/2003 | Natarajan et al. | ........... | 709/224 |
| 6,678,835 B1 * | 1/2004 | Shah et al. | ........... | 714/4 |
| 6,701,441 B1 * | 3/2004 | Balasubramaniam et al. | . | 726/25 |
| 6,874,088 B1 * | 3/2005 | Stevens | ........... | 726/6 |
| 6,957,348 B1 * | 10/2005 | Flowers et al. | ........... | 726/23 |
| 6,990,527 B2 * | 1/2006 | Spicer et al. | ........... | 709/229 |
| 7,003,562 B2 * | 2/2006 | Mayer | ........... | 709/223 |
| 7,117,526 B1 * | 10/2006 | Short | ........... | 726/5 |
| 7,130,854 B2 * | 10/2006 | Beadles et al. | ........... | 707/10 |
| 7,225,460 B2 * | 5/2007 | Barzilai et al. | ........... | 726/1 |
| 7,263,719 B2 * | 8/2007 | Jemes et al. | ........... | 726/12 |
| 2002/0116639 A1 * | 8/2002 | Chefalas et al. | ........... | 713/201 |
| 2002/0143923 A1 * | 10/2002 | Alexander | ........... | 709/223 |
| 2002/0194486 A1 * | 12/2002 | Heinrich et al. | ........... | 713/200 |
| 2003/0037040 A1 * | 2/2003 | Beadles et al. | ........... | 707/1 |
| 2003/0051161 A1 * | 3/2003 | Smith et al. | ........... | 713/201 |
| 2003/0061482 A1 * | 3/2003 | Emmerichs | ........... | 713/165 |
| 2003/0135749 A1 * | 7/2003 | Gales et al. | ........... | 713/200 |
| 2003/0163728 A1 * | 8/2003 | Shaw | ........... | 713/201 |

(Continued)

OTHER PUBLICATIONS

Morris Sloman, et al. "Security and Management Policy Specification", IEEE Network, Mar./Apr. 2002. pp. 10-19.

*Primary Examiner*—Carl Colin
(74) *Attorney, Agent, or Firm*—Marger Johnson & McCollom, P.C.

(57) ABSTRACT

The invention is a system and method for applying a uniform network security policy. The security policy is described using a computer-readable file. The computer-readable file may be filtered and/or translated into other files that may be used as inputs to security devices. An example of one such security device is a remote system security controller, which is responsible for ensuring that remote devices outside the corporate network enforce the corporate security policy. In addition, the system is capable of updating the security policy of all network components based on feedback received from one or more devices.

31 Claims, 9 Drawing Sheets

U.S. PATENT DOCUMENTS

2003/0177389 A1* 9/2003 Albert et al. ................ 713/201
2003/0188189 A1* 10/2003 Desai et al. ................ 713/201
2004/0103315 A1* 5/2004 Cooper et al. ............... 713/201

* cited by examiner

METHOD AND APPARATUS FOR ENFORCING NETWORK SECURITY POLICIES

FIELD

This invention pertains to network security, and more particularly to establishing a uniform security policy.

BACKGROUND

As computers become a more and more important part of our lives, the security of the computers becomes increasingly important. All too often, news reports describe the vulnerability of computers in one form or another. Between hackers breaking into "secure" computers, virus alerts, and warnings about newly discovered vulnerabilities in computer operating systems, computer security is kept in the public eye.

To help address security issues, many security devices have become commonplace in computer networks. Businesses have awakened to the need for firewalls, intrusion detection systems, virus scanning software and logging/monitoring devices (the last item used to analyze an attack on the corporate network after the immediate threat has been addressed). And with the increasing concern about employees using business computers for non-business tasks, employers are also using proxy servers. Proxy servers watch outgoing traffic and block inappropriate activities (such as visits to offensive web sites or the use of software, such as Java or ActiveX that should not be used).

But the way a security policy is implemented on these security devices is somewhat haphazard. Policy is set at the top of the corporate pyramid, and propagated downward to the persons who manage the various security devices. Each security device receives its own programming to define the security policy as it is to be enforced by the individual security device. There is no coordination between the various security devices to ensure that all the holes are filled. And while there are firewalls capable of providing inputs to other firewalls (expecting different inputs), these are a special case.

An additional problem arises with devices that may be taken outside the corporate network. An employee may use a computer outside the network (such as a laptop computer supplied by the company, the employee's home computer, or wireless devices, such as Personal Digital Assistants (PDAs)) to access the corporate network from outside. There is currently no way for the corporate security policy to be enforced with respect to mobile devices. For example, although corporate policy may dictate that ActiveX be disabled in computer browsers, the user on the remote computer may enable ActiveX with a few simple commands. And since the remote computer connects to the Internet without going through the corporate proxy server, this violation of the corporate policy may not be detected.

A need remains for a way to addresses these and other problems associated with the prior art.

DETAILED DESCRIPTION

Figure 1:
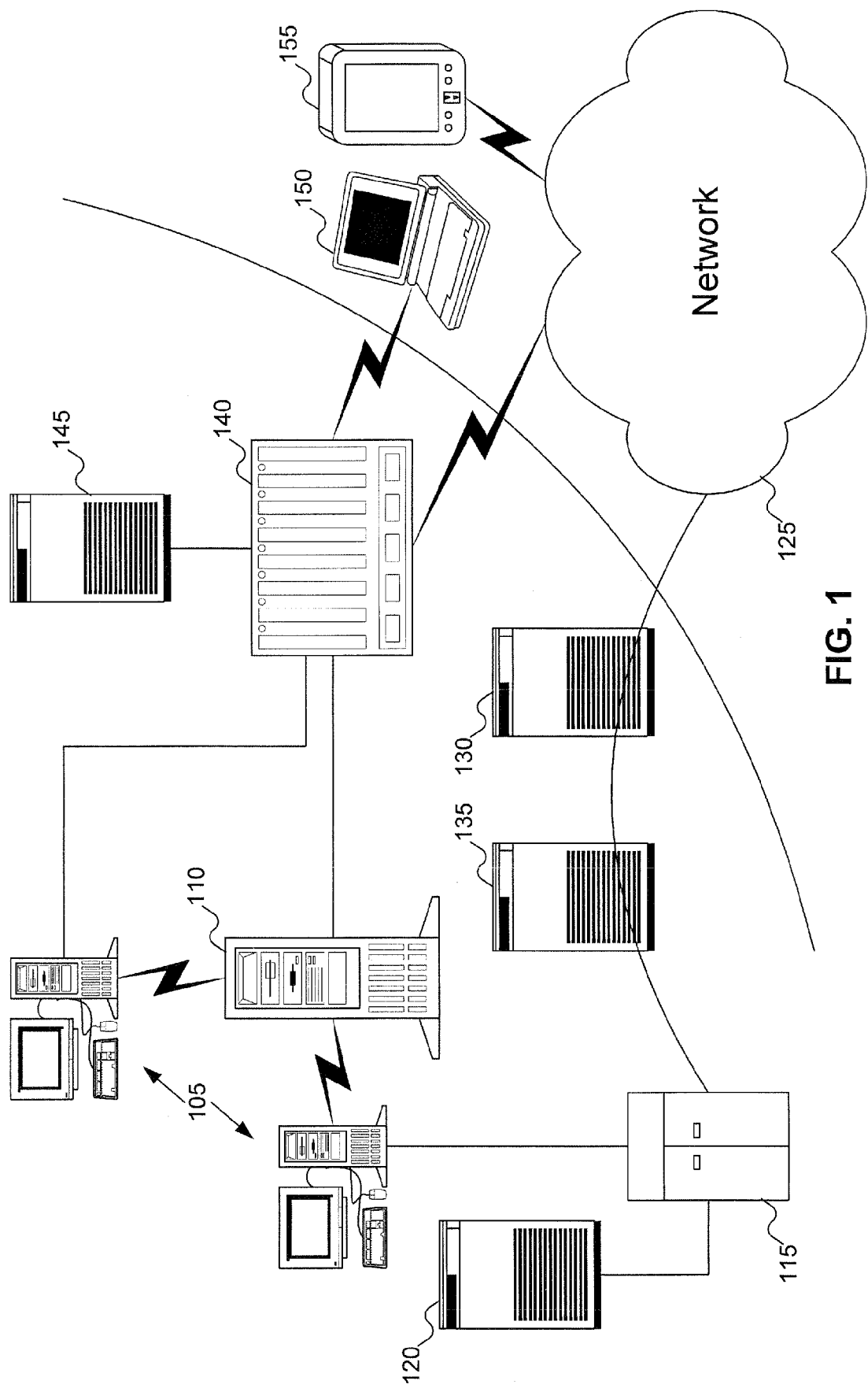
FIG. 1 shows a corporate network and outside devices according to an embodiment of the invention.

FIG. 1 shows a corporate network (also called an intranet, meaning a network within (or intra) the business) and outside devices according to an embodiment of the invention. In FIG. 1, a corporate network is shown, along with an external network, such as the Internet. Within the corporate network, workstations 105 represent computers used by employees. Although shown as desktop computer models, a person skilled in the art will recognize that workstations 105 may be any type of personal computer, including but not limited to desktop computers, laptop computers, wireless devices, and so on. Note that for wireless devices or laptop computers to be connected to the corporate network, they must be connected to an access point, such as a network port or wireless connection point internal to the company.

Workstations 105 connect to internal server 110. Internal server 110 stores information available within the corporate network. For example, internal server 110 may store corporate web sites not available to the general public via the Internet, or corporate data. A person skilled in the art will recognize other types of data that may be stored on internal server 110.

To access data outside the corporate network, users at workstations 105 connect to proxy server 115, which in turn connects with network 125. Proxy server 115 is responsible for determining that data requests are appropriate for devices within the corporate network. For example, proxy server 115 may block a request to access a web site with inappropriate content. Or proxy server 115 may determine that workstation 105 is set to use ActiveX, contrary to corporate policy, and to block the ActiveX objects on the web site from running. A person skilled in the art will recognize other functions that proxy server 115 may perform.

One function that proxy server 115 may perform is logging communications between workstations 105 and sites outside the corporate network. The log may then be used to review corporate workstation use, to determine if any of the corporate workstations have been used for purposes outside the scope of an employee's duties. Logging/monitoring device 120 is responsible for logging the communications. Logging/monitoring device 120 may be implemented as software within proxy server 115, or it may be a separate component of the corporate network security system.

Protecting the corporate network from outside attack are firewall 130 and intrusion detection system 135. Firewall 130 is responsible for filtering data requests coming from outside the corporate network. Intrusion detection system 135 is responsible for monitoring the corporate network for probes by hackers, and for stopping attacks if possible.

Opening a door in the corporate security policy for legitimate users, server 140 is responsible for receiving incoming requests for communication. Server 140 may receive requests for communication via a direct dial-up (i.e., a direct telephone line connects to server 140, which legitimate users may dial to directly connect to the corporate network). Server 140 may also be configured to process requests to open a Virtual Private Network (VPN) between the corporate network and a device connected to network 120. A person skilled in the art will recognize other ways in which server 140 may be configured to permit legitimate communication with the corporate network. For example, server 140 may be configured to process wireless communications from outside the corporate network.

Assisting server 140 in enforcing corporate security policy is remote system security controller (RSSC) 145. RSSC 145 is responsible for determining that outside devices granted access to the corporate network are properly configured to enforce the corporate security policy. The operation of RSSC 145 will be discussed further with reference to FIG. 4, below.

When a device outside the corporate network wants to access data within the corporate network, server 140 receives the request for a connection. In FIG. 1, notebook computer 150 and wireless device 155 are each shown requesting a connection from server 140, although in different ways. Notebook computer 150 is shown requesting a connection directly from server 140, whereas wireless device 155 is shown requesting a VPN through network 120. But a person skilled in the art that other types of connections may be used, and that devices other than a notebook computer or wireless device may be used to request a connection with server 140.

Once server 140 has received the request, server 140 may authenticate the request. This typically involves receiving from the user a log in identification and password, but a person skilled in the art will recognize other ways in which authentication may be performed. Authentication may also be skipped, if desired. If the user requesting the connection is unable to authenticate himself, server 140 denies the connection request without further ado.

If the user is authenticated, then server 140 interrogates the remote device to determine if the remote device includes the remote system security agent (RSSA). The RSSA is responsible for configuring the security of the remote device, and works in coordination with RSSC 145. If the RSSA is not present, then server 140 denies the connection request. Otherwise, server 140 passes control to RSSC 145 to ensure that the remote device is properly configured to maintain the security of the corporate network, according to the established security policy.

Although FIG. 1 shows the corporate network as including most of the security elements (that is, proxy server 115, firewall 130, intrusion detection system 135, server 140 for outside connections, and RSSC 145), a person skilled in the art will recognize that, depending on the corporate security policy, one or more of these components may be omitted. For example, if the corporate network is not concerned about outside attack, firewall 130 and/or intrusion detection system 135 may be omitted from the corporate network.

Figure 2:
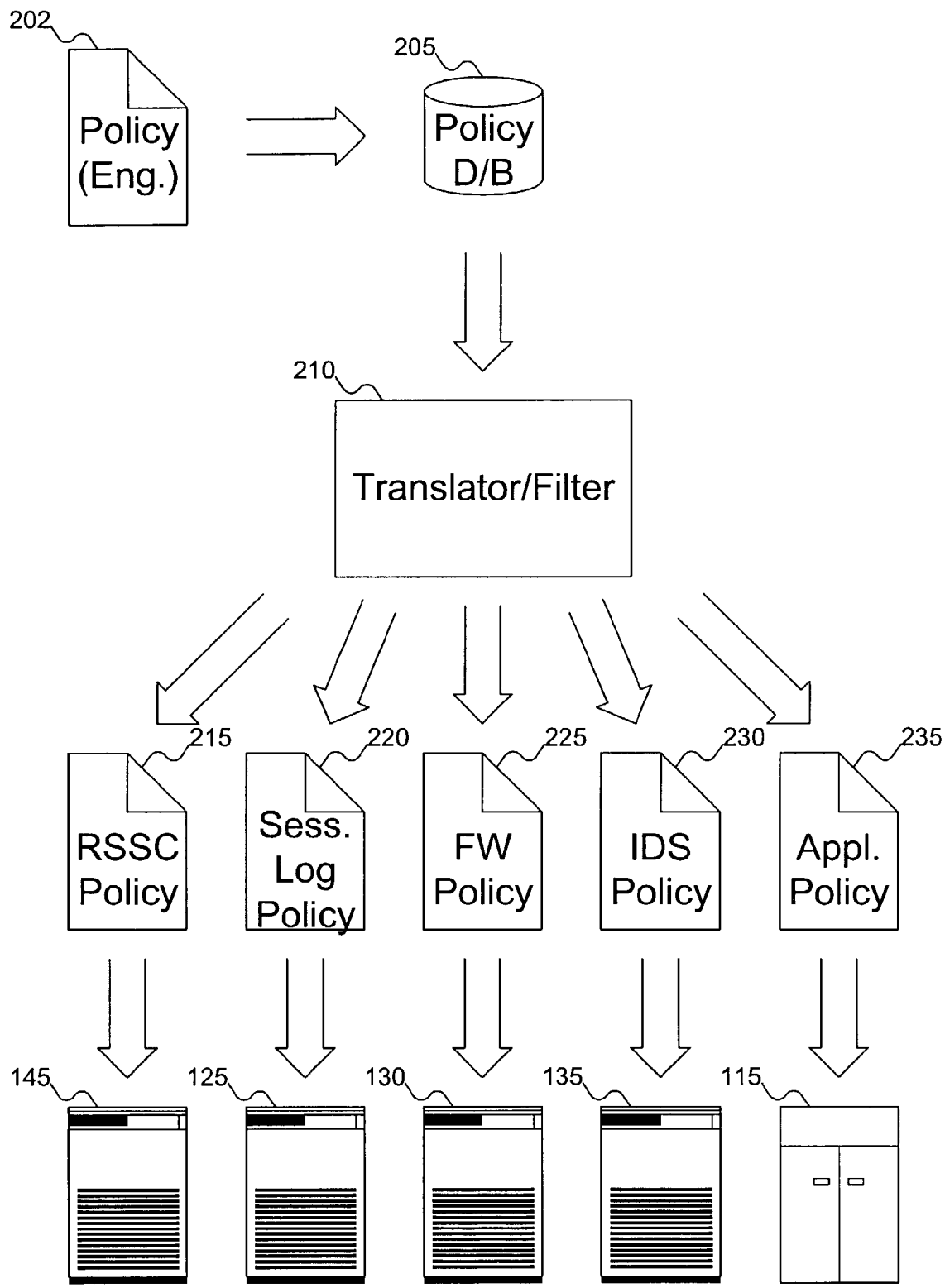
FIG. 2 shows a translator translating a network-wide security policy into security policies for individual security devices as shown in FIG. 1, according to an embodiment of the invention.

FIG. 2 shows a translator translating a network-wide security policy into security policies for individual security devices as shown in FIG. 1, according to an embodiment of the invention. In FIG. 2, policy database 205 is a computer-readable file (that is, a file accessible by a machine) that defines the security policy for the entire corporate network. Security policy usually begins as an English- (or other-) language policy stated informally by a person with the appropriate level of authority in the company. The policy is then translated into policy database 205, which defines the policy electronically. Note that policy database 205 is a network-wide security policy, and is not specific to any particular security device. In one embodiment, policy database 205 is defined in a language that is neutral relative to the various security devices, such as eXtensible Markup Language (XML).

Once defined, policy database 205 may include security definitions that apply to many security devices. It is the job of translator/filter 210 to separate policy database 205 into separate files for each individual security device in the corporate network. Translator/filter 210 scans policy database 205 and eliminates any entries not pertinent to the particular security device. This is also discussed further with reference to FIG. 3 below.

Translator/filter 210 may also translate from the language in which policy database 205 is stored into a language understood by the individual security devices. The individual security devices may understand languages with different semantics and syntaxes. Translator/filter 210 is designed to "speak" the language of the individual security devices and to translate policy database 205 into the various languages.

For example, translator/filter 210 is shown in FIG. 2 translating policy database 205 into policy files 215, 220, 225, 230, and 235, for RSSC 145, logging/monitoring device 125, firewall 130, intrusion detection system 135, and proxy server 115, respectively. Policy files 215, 220, 225, 230, and 235 may be used as inputs to the various security devices to define the settings of the various security devices, thereby implementing the network-wide security policy.

Figure 3:
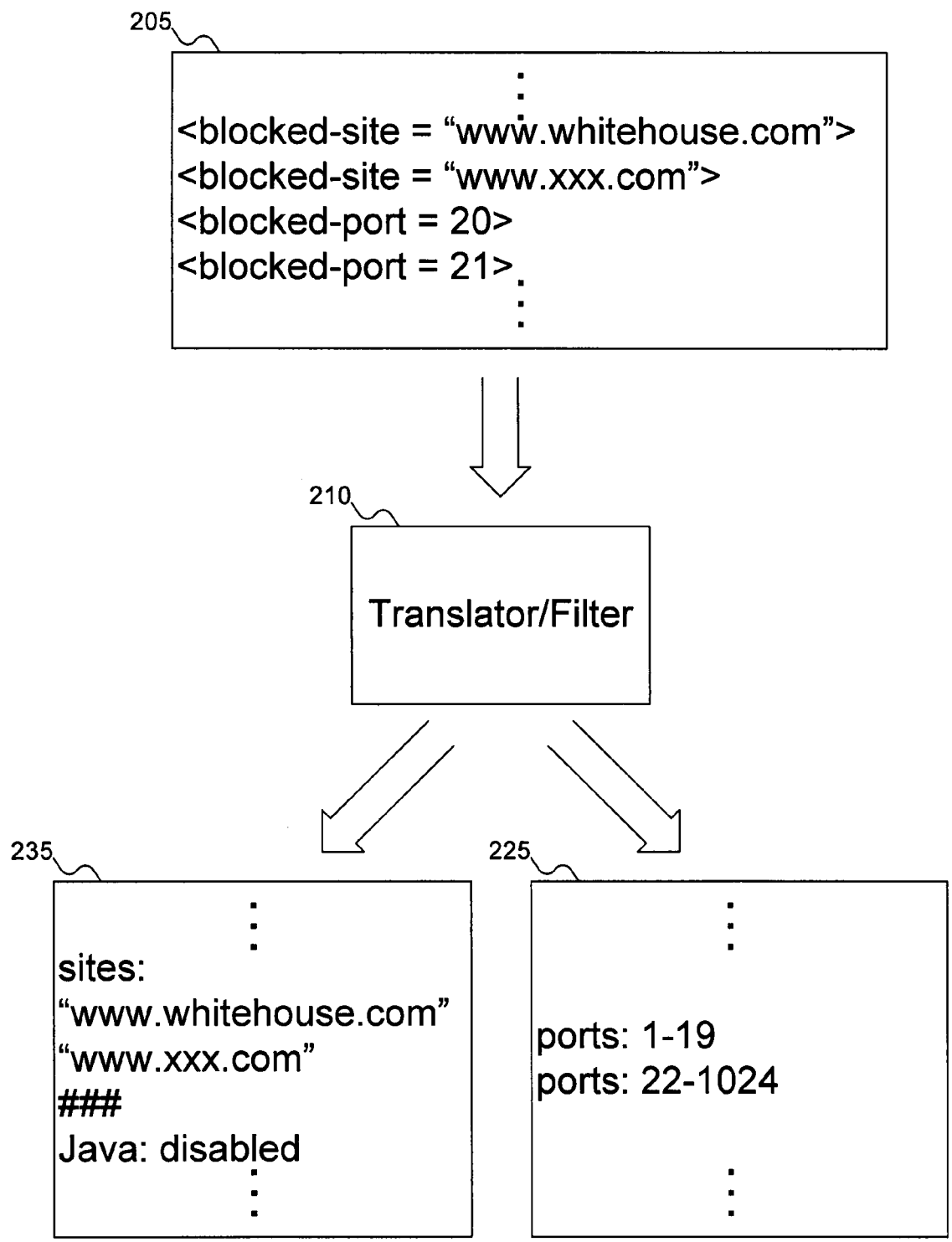
FIG. 3 shows details of the translator of FIG. 2, according to an embodiment of the invention.

FIG. 3 shows details of the translator of FIG. 2, according to an embodiment of the invention. In FIG. 3, a portion of policy database 205 is shown in detail. Policy database 205 includes two sites to which the proxy server is to block access, and two port settings on which the firewall is to block incoming communication requests. Since the firewall does not need to know about sites employees are not supposed to visit, and the proxy server does not need to know about ports on which communications requests are to be ignored, policy database 205 includes settings not applicable to both devices. Translator/filter 210 separates the settings into the respective policy files, including in each policy file only the settings pertinent to the respective security device.

Notice also that in FIG. 3, the syntax of policy files 225 and 235 are different from each other and from that of policy database 205. Translator 210 is responsible for translating the settings in policy database 205 into the native language understood by the various security devices, so that the security devices may understand the inputs.

Figure 4:
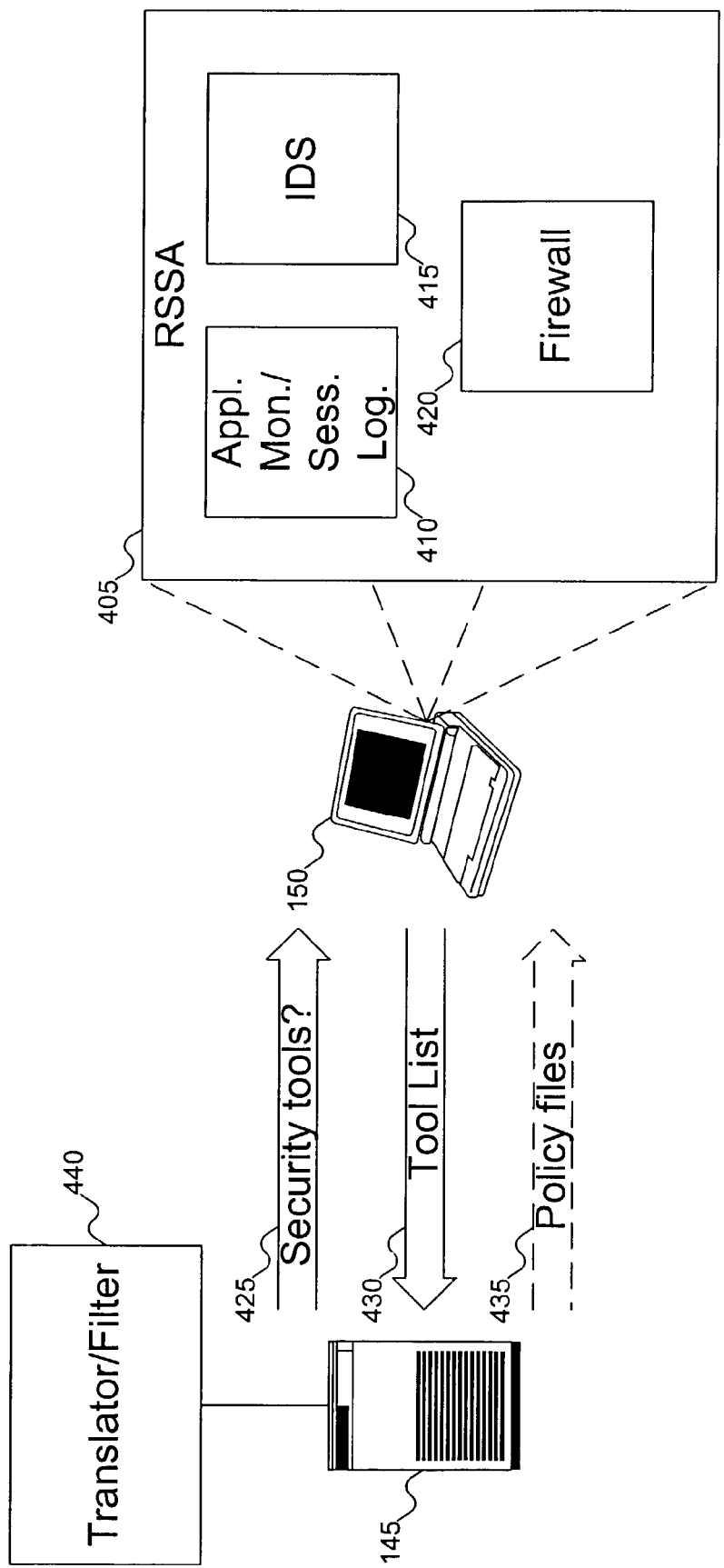
FIG. 4 shows a portable device configured to interact with the network of FIG. 1 and designed to comply with the security policy, according to an embodiment of the invention.

FIG. 4 shows a portable device configured to interact with the network of FIG. 1 and designed to comply with the security policy, according to an embodiment of the invention. In FIG. 4, remote device 150 is shown as a notebook computer, but a person skilled in the art will recognize that any type of device capable of interacting with the corporate network may be used. For example, wireless device 155 from FIG. 1 may be substituted for notebook computer 150 in FIG. 4.

In FIG. 4, remote device 150 includes remote system security agent (RSSA) 405. RSSA 405 manages the security tools used by the remote device 150 and implements the corporate security policy in coordination with RSSC 145. Specifically, RSSA 405 configures the security tools used by remote device 150 to bring remote device 150 in compliance with the corporate security policy.

As shown in FIG. 4, remote device 150 may include three security tools: application monitor/session logging tool 410, intrusion detection system 415, and firewall 420. These are usually the software analogs to proxy server 115, intrusion detection system 135, and firewall 130 of FIG. 1, but a person skilled in the art will recognize that these tools may be implemented in hardware as well. As discussed above with reference to FIG. 1, when remote device 150 attempts to connect to the corporate network, server 140 authenticates the user and determines that remote device 150 includes RSSA 405. Once remote device 150 has been verified as having the required elements, server 140 hands control off to RSSC 145. RSSC 145 then verifies whether remote device 150 is in compliance with the corporate security policy, and if not, whether remote device 150 may be brought into compliance.

RSSC 145 begins by interrogating remote device 150 for the security tools installed in remote device 150, as shown by arrow 425. The remote device responds with the list of installed security tools, as shown by arrow 430. This exchange serves two purposes. First, it enables RSSC 145 to know whether remote device 150 has the necessary tools to comply with the corporate security policy. Second, it lets RSSC 145 know the "language" of the tools used by remote device 150 to enforce security, so that RSSC 145 may translate the security settings into a language understood by the tools.

If remote device 150 lacks a required security tool (for example, if remote device 150 does not have firewall 420 installed), RSSC 145 may deny the connection request. Otherwise, RSSC 145 may send updates to the installed tools, as shown by arrow 435. To accomplish this, RSSC 145 includes translator/filter 440. Translator/filter 440 operates very similarly to translator/filter 205 of FIGS. 2 and 3, except that the target "languages" of the translated/filtered policy files are those of security tools 410, 415, and 420. Once the policy files are installed, remote device 150 is in compliance with the corporate security policy, and may be permitted to access data on the corporate network.

As shown, FIG. 4 describes applying the corporate security policy to the security tools on remote device 150 without first determining if the security tools comply with the policy. A person skilled in the art will recognize that RSSC 145 may interrogate remote device 150 to determine the current settings for the various security tools, and only transmit the necessary updates (if any) in policy files in arrow 435. For this reason, the transmission of the policy updates in arrow 435 is shown with a dashed line.

Figure 5:
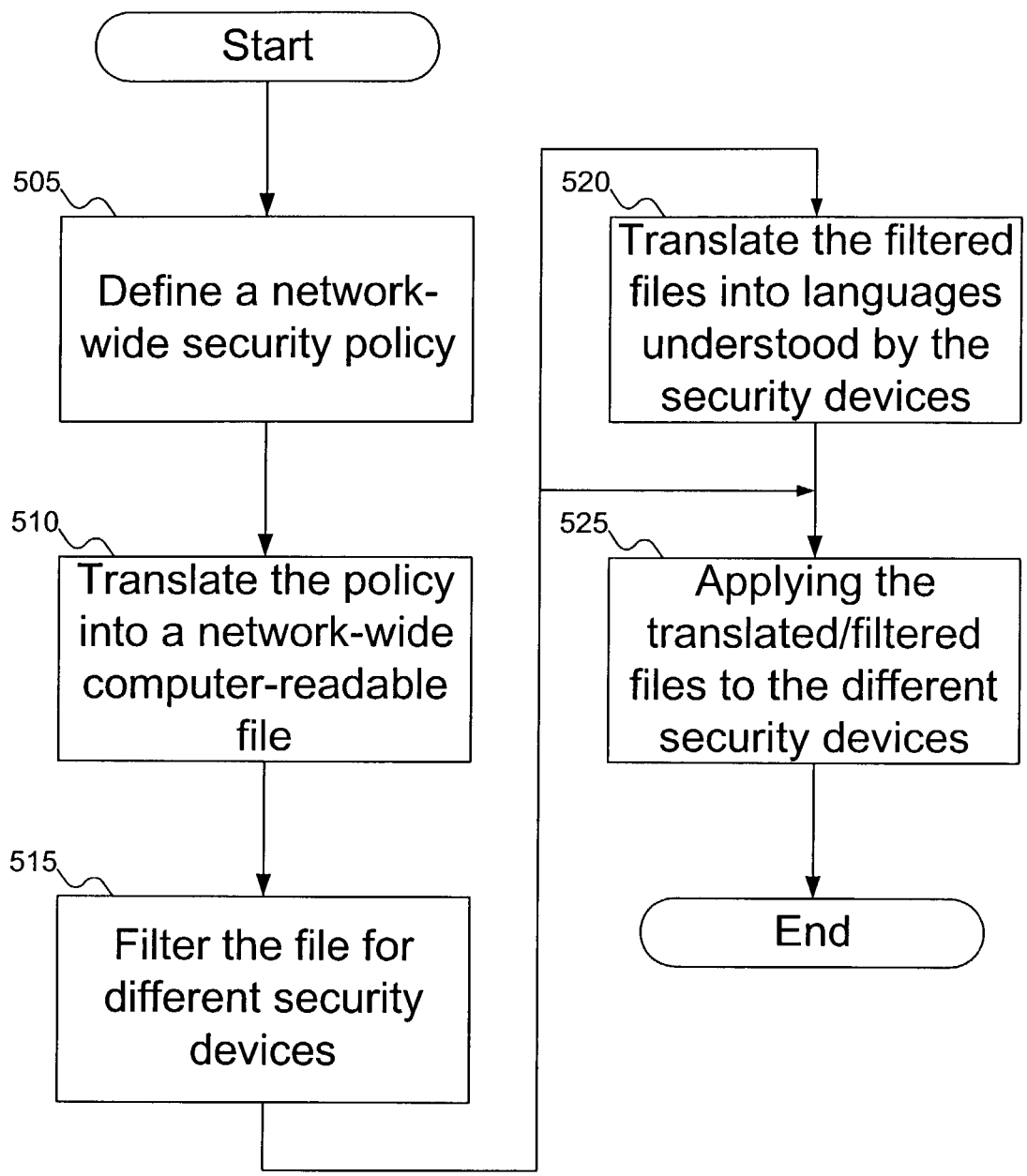
FIG. 5 shows a flowchart of the procedure used to establish a uniform network security policy on the network of FIG. 1, according to an embodiment of the invention.

FIG. 5 shows a flowchart of the procedure used to establish a uniform network security policy on the network of FIG. 1, according to an embodiment of the invention. In FIG. 5, at block 505, a network-wide corporate security policy is defined. This is the corporate security policy as defined in "English" by the appropriate corporate personnel. At block 510, the corporate security policy is translated into a computer-readable file. At block 515, for each security device, the computer-readable file is filtered so that only the policy statements appropriate for the security device are considered. At block 520, the filtered files are translated into languages understood by the security devices. Note that if the computer-readable file produced at block 510 is in the same "language" as that understood by any or all of the security devices, then translation may not be necessary, and block 520 may be omitted. Finally, at block 525, the translated/filtered policy file is applied to the security devices.

Figure 6A:
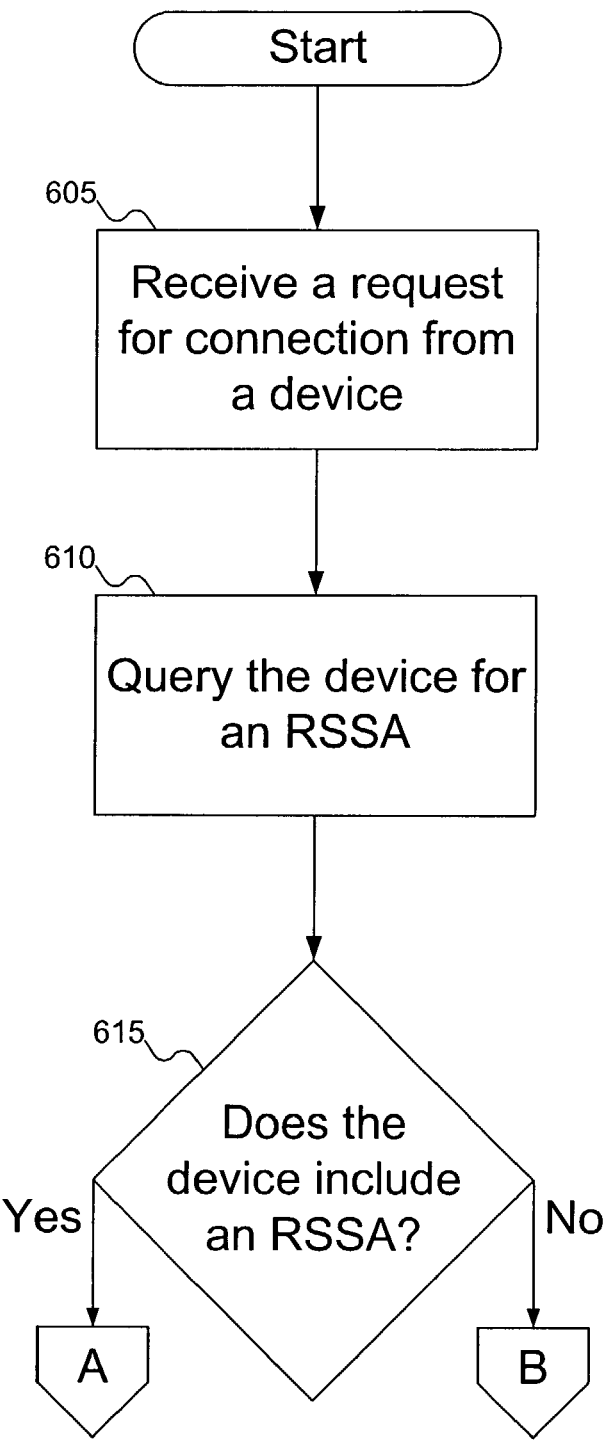
FIGS. 6A-6C show a flowchart of the procedure used to grant or deny a request for a portable device to connect to the network of FIG. 1, according to an embodiment of the invention.
Figure 6B:
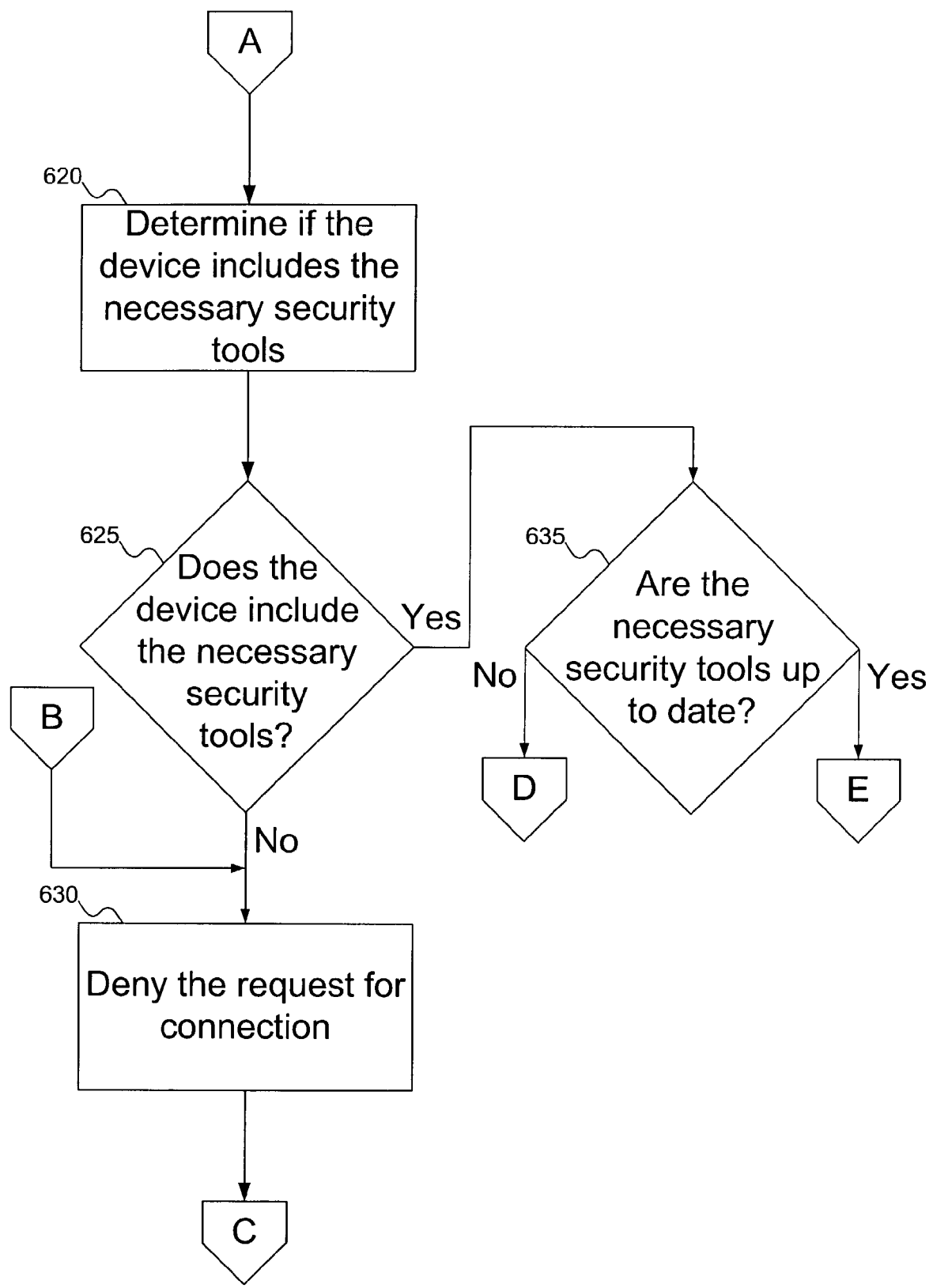
Figure 6C:
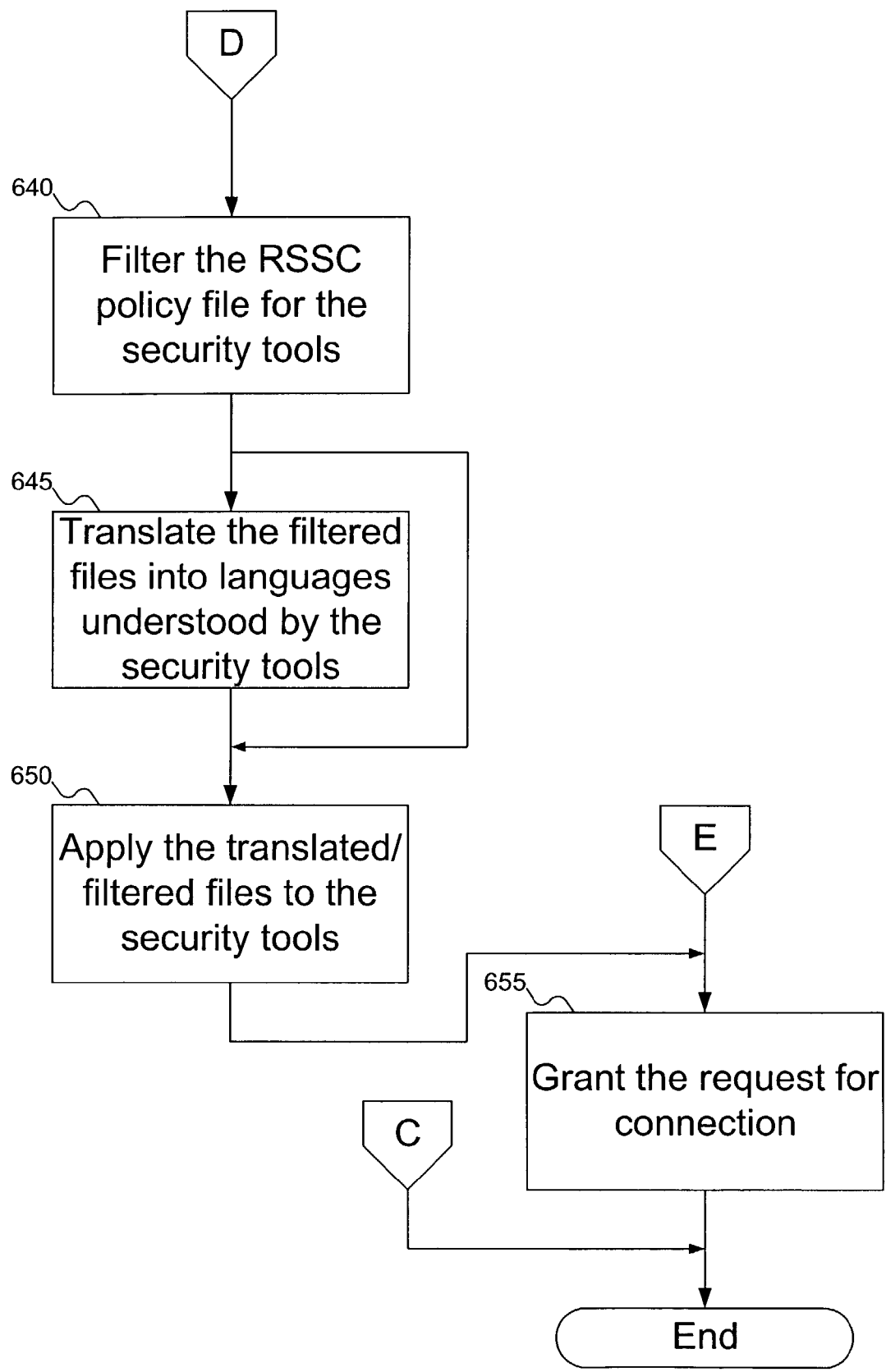

FIGS. 6A-6C show a flowchart of the procedure used to grant or deny a request for a portable device to connect to the network of FIG. 1, according to an embodiment of the invention. In FIG. 6A, at block 605, the server designated for processing requests to connect to the corporate network from outside (in FIG. 1, server 140) receives a request for a connection. (Implicit in FIG. 6 is the authentication of the user of the requesting device.) At block 610, the server queries the requesting device to see it has the RSSA. At decision point 615, the server decides what to do after querying the device for the RSSA. Assuming the device has the RSSA, then at block 620 (FIG. 6B), the RSSC queries the requesting device to determine what security tools are installed. At decision point 625, the RSSC determines if the requesting device has sufficient security tools to enforce the corporate security policy. If the requesting device does not have the necessary security tools (or if the requesting device did not have the RSSA at decision point 615 in FIG. 6A), then at block 630 the request for a connection is denied. Otherwise, at decision point 635 the RSSC determines if the security tools are up-to-date in enforcing the corporate security policy. If the security tools are not up-to-date, then at block 640 (FIG. 6C), the RSSC filters the policy file for the various security tools on the remote device, and (if necessary) translates the filtered policy files into "languages" understood by the various security tools at block 645. At block 650, the translated/filtered policy files are applied to the security tools. Finally, at block 655, the request for a connection is granted. (Block 655 is also executed if the RSSC determined the security tools to be up-to-date at decision point 635 in FIG. 6B.)

As discussed above with reference to FIG. 4, the RSSC may apply the security policy without bothering to determine if the security tools on the remote device currently enforce the policy. That is, the RSSC might assume that the security tools on the remote device do not support the corporate security policy. In that case, decision point 635 may be omitted and control passed directly from block 630 to 640.

Figure 7:
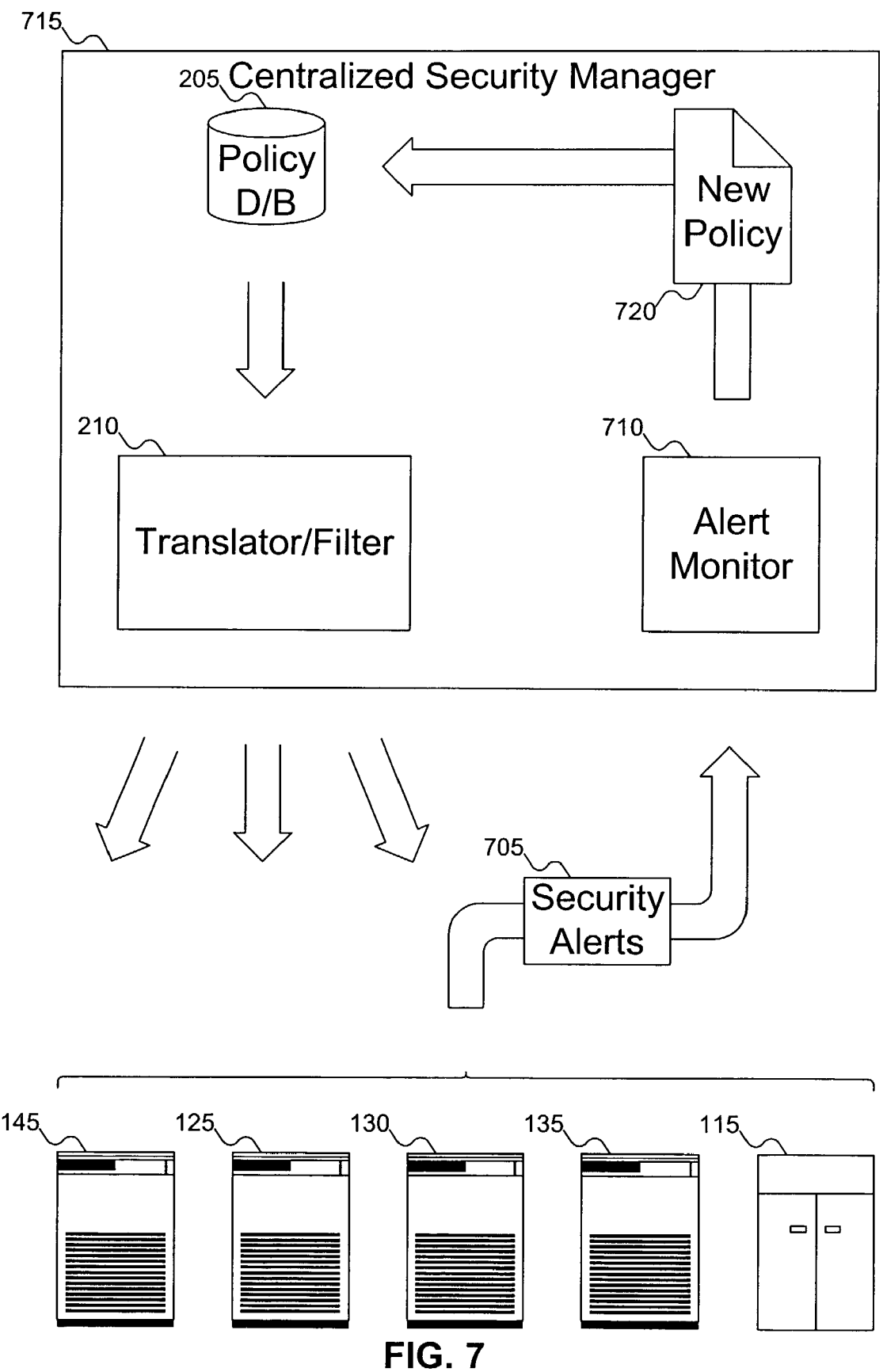
FIG. 7 shows the individual security devices of FIG. 1 providing feedback regarding the network-wide security policy, according to an embodiment of the invention.

One benefit of centralized policy control is the capability to update the policy database based on feedback from the various devices enforcing the policy. FIG. 7 illustrates this advantage. In FIG. 7, the individual security devices are shown issuing security alerts 705. These are received by alert monitor 710, part of centralized security manager 715. Upon receiving security alerts 705, centralized security manager 715 can determine if the policy database needs updating. If so, centralized security manager 715 can send policy update 720 to policy database 205, which can then be translated and filtered for the various individual security devices.

Although the term "security alert" suggests that the individual devices only provide feedback when someone is attempting to circumvent the policy, a person skilled in the art will recognize that the individual devices can issue any type of feedback to centralized security manager 715. For example, an individual security device might receive an update from an external site regarding the general programming of the individual security device, which might impact the network policy.

A person skilled in the art will recognize that an embodiment of the invention described above may be implemented using a computer. In that case, the method is embodied as instructions that comprise a program. The program may be stored on computer-readable media, such as floppy disks, optical disks (such as compact discs), or fixed disks (such as hard drives). The program may then be executed on a computer to implement the method.

Having illustrated and described the principles of the invention in an embodiment thereof, it should be readily apparent to those skilled in the art that the invention may be modified in arrangement and detail without departing from such principles. All modifications coming within the spirit and scope of the accompanying claims are claimed.

The invention claimed is:

1. A system for establishing a security policy for a network, comprising:
a network;
a server connected to the network;

a first machine-accessible file representing a network-wide security policy on the network;

first and second security tools connected to the network;

a translator operative to translate the first machine-accessible file into second and third machine-accessible files that are specific to the first and second security tools, respectively, and to transmit the second and third machine-accessible files to the first and second security tools, respectively, wherein the second machine-accessible file comprises a different language than the first machine-accessible file;

a security manager to receive a feedback issued by at least one of the first and second security tools and update the first machine-accessible file responsive to the feedback; and a remote system security controller configured to:
receive a request for a connection to the network from a device;
determine if the device includes a third security tool, including:
authenticating a user of the device by the server;
determining by the server that the device includes a remote system security agent;
passing control from the server to the remote system security controller;
interrogating the device to determine if the device includes the third security tool; and
receiving a response from the device including a list of installed security tools, the list including the language of each of the installed security tools.

2. A system according to claim 1, wherein the first and second security tools are drawn from a set including a proxy server, a firewall, an intrusion detection system, and a logging/monitoring device.

3. A system according to claim 1, wherein the translator includes a filter operative to filter a first entry in the first machine-accessible file from the second machine-accessible file such that the first entry is not included in the second machine-accessible file, and to filter a second entry in the first machine-accessible file from the third machine-accessible file.

4. A system according to claim 1, wherein the first machine-accessible file represents the network-wide security policy on the network for controlling interaction between a first machine internal to the network and a second machine external to the network.

5. A system for establishing a security policy for a network, comprising:
a network;
a first machine-accessible file representing a network-wide security policy on the network, wherein the first machine-accessible file includes security definitions applicable to a plurality of security tools, the security definitions including at least one website identifier;
an internal server connected to the network and operative to store internal corporate data;
a proxy server connected to the network, the proxy server operative to block access to first data external to the network;
a firewall connected to the network, the firewall operative to filter data requests originating external to the network;
an intrusion detection system connected to the network, the intrusion detection system operative to monitor the network for external attacks;
at least one workstation operative to access second data external to the network via the proxy server;

a translator operative to translate the first machine-accessible file into second, third, and fourth machine-accessible files for the proxy sewer, firewall, and instruction detection system, respectively, and to transmit the second, third, and fourth machine-accessible files to the proxy sewer, firewall, and instruction detection system, respectively, wherein at least one of the second, third, and fourth machine-accessible files comprises a different language than the first machine-accessible file and wherein at least one of the second, third, and fourth machine-accessible files comprises fewer security definitions than the first machine-accessible file;

a security manager to receive a feedback issued by at least one of the proxy server, firewall, and intrusion detection system and update the first machine-accessible file responsive to the feedback, wherein the feedback comprises at least one of a security alert and an update notification; and a remote system security controller configured to:
receive a request for a connection to the network from a remote device;
determine if the remote device includes a remote system security agent and at least one security tool, including:
authenticating a user of the remote device by the proxy server
determining by the proxy sewer that the remote device includes a remote system security agent
passing control from the proxy server to the remote system security controller;
interrogating the remote device to determine if the remote device includes the at least one security tool; and
receiving a response from the remote device including a list of installed security tools, the list including the language of each of the installed security tools.

6. A system according to claim 5, wherein the translator is operative to translate the first machine-accessible file into a fifth machine-accessible file for the remote system security controller.

7. A system according to claim 5, wherein:
the system further comprises a logging/monitoring device to log communications between the workstations in the network and sources external to the network; and
the translator is operative to translate the first machine-accessible file into a sixth machine-accessible file for the logging/monitoring device.

8. A system according to claim 5, wherein the first machine-accessible file represents the network-wide security policy on the network for controlling interaction between a first machine internal to the network and a second machine external to the network.

9. A method for enforcing security policy on a network, comprising:
generating a first machine-accessible file representing a network-wide security policy on a network;
translating the first machine-accessible file into second and third machine-accessible files for first and second security tools, respectively, wherein the second machine-accessible file comprises a different language than the first machine-accessible file;
transmitting the second and third machine-accessible files to the first and second security tools, wherein transmitting the second and third machine-accessible files includes transmitting the second machine-accessible file to a remote system security controller;
receiving a feedback from at least one of the first and second security tools;

updating the first machine-accessible file responsive to the feedback;

receiving a request for a connection to the network from a device;

determining by the remote system security controller if the device includes a third security tool to enforce the security policy, wherein determining by the remote system security controller if the device includes the third security tool to enforce the security policy comprises:

authenticating a user of the device by a server;

determining by the server that the device includes a remote system security agent;

passing control from the server to the remote system security controller;

interrogating the device to determine if the device includes the third security tool and receiving a response from the device including a list of installed security tools, the list including the language of each of the installed security tools; and granting by the remote system security controller the request for the connection to the network if the device includes the third security tool to enforce the security policy.

10. A method according to claim 9, wherein translating the first machine-accessible file includes filtering an entry in the first machine-accessible file from the second machine-accessible file.

11. A method according to claim 9, wherein translating the first machine-accessible file includes translating the first machine-accessible file from a first language to a second language that is different from the first language and is recognizable to the first security tool.

12. A method according to claim 9, wherein transmitting the second and third machine-accessible files includes transmitting the third machine-accessible file to at least one of a proxy server, a firewall, an intrusion detection system, and a logging/monitoring device.

13. A method according to claim 9, the method further comprising denying by the remote system security controller the request for the connection to the network if the device lacks the third security tool to enforce the security policy.

14. A method according to claim 9, wherein receiving a request includes receiving the request for a wireless connection to the network from the device.

15. A method according to claim 9, wherein determining by the remote system security controller if the device includes the third security tool includes determining by the remote system security controller if the device includes at least an application monitoring tool, an intrusion detection tool, and a firewall tool.

16. A method according to claim 15, wherein determining by the remote system security controller if the device includes the third security tool further includes determining by the remote system security controller if the device includes a session logging tool.

17. A method according to claim 9, the method further comprising:

translating the second machine-accessible file into a fourth machine-accessible file for the third security tool on the device;

transmitting the fourth machine-accessible file to the device; and applying the fourth machine-accessible file to the third security tool on the device.

18. A method according to claim 17, wherein applying the fourth machine-accessible file includes changing a setting in the third security tool on the device.

19. A method according to claim 9, wherein generating a first machine-accessible file representing a network-wide security policy on a network includes generating the first machine-accessible file representing the network-wide security policy on the network for controlling interaction between a first machine internal to the network and a second machine external to the network.

20. A method according to claim 9 wherein authenticating the request comprises receiving a user identification and a password from the device.

21. An article comprising a machine-accessible medium having associated data that, when accessed, results in a machine:

generating a first machine-accessible file representing a network-wide security policy on a network;

translating the first machine-accessible file into second and third machine-accessible files for first and second security tools, respectively, wherein the second machine-accessible file comprises a different language than the first machine-accessible file;

transmitting the second and third machine-accessible files to the first and second security tools, wherein transmitting the second and third machine-accessible files includes transmitting the second machine-accessible file to a remote system security controller;

receiving a feedback from at least one of the first and second security tools;

updating the first machine-accessible file responsive to the feedback;

receiving a request for a connection to the network from a device;

determining by the remote system security controller if the device includes a third security tool to enforce the security policy, wherein determining by the remote system security controller if the device includes the third security tool to enforce the security policy comprises:

authenticating a user of the device by a server;

determining by the server that the device includes a remote system security agent;

passing control from the server to the remote system security controller;

interrogating the device to determine if the device includes the third security tool; and receiving a response from the device including a list of installed security tools, the list including the language of each of the installed security tools; and granting by the remote system security controller the request for the connection to the network if the device includes the third security tool to enforce the security policy.

22. An article according to claim 21, wherein the associated data for translating the first machine-accessible file includes associated data for filtering an entry in the first machine-accessible file from the second machine-accessible file.

23. An article according to claim 21, wherein the associated data for translating the first machine-accessible file includes associated data for translating the first machine-accessible file from a first language to a second language that is different from the first language and is recognizable to the first security tool.

24. An article according to claim 21, wherein the associated data for transmitting the second and third machine-accessible files includes associated data for transmitting the second and third machine-accessible files to the first and second security tools drawn from a set including a proxy server, a firewall, an intrusion detection system, and a logging/monitoring device.

25. An article according to claim 21, the machine-accessible medium having further associated data that, when accessed, results in the machine denying by the remote system security controller the request for the connection to the network if the device lacks the third security tool to enforce the security policy.

26. An article according to claim 21, wherein the associated data for receiving a request includes associated data for receiving the request for a wireless connection to the network from the device.

27. An article according to claim 21, wherein the associated data for determining by the remote system security controller if the device includes the third security tool includes associated data for determining by the remote system security controller if the device includes at least an application monitoring tool, an intrusion detection tool, and a firewall tool.

28. An article according to claim 27, wherein the associated data for determining by the remote system security controller if the device includes the third security tool further includes associated data for determining by the remote system security controller if the device includes a session logging tool.

29. An article according to claim 21, the machine-accessible medium having further associated data that, when accessed, results in the machine:

translating the second machine-accessible file into a fourth machine-accessible file for the third security tool on the device;

transmitting the fourth machine-accessible file to the device; and applying the fourth machine-accessible file to the third security tool on the device.

30. An article according to claim 29, wherein the associated data for applying the fourth machine-accessible file includes the associated data for changing a setting in the third security tool on the device.

31. An article according to claim 21, wherein generating a first machine-accessible file representing a network-wide security policy on a network includes generating the first machine-accessible file representing the network-wide security policy on the network for controlling interaction between a first machine internal to the network and a second machine external to the network.

* * * * *

UNITED STATES PATENT AND TRADEMARK OFFICE
CERTIFICATE OF CORRECTION

PATENT NO.        : 7,448,067 B2                                         Page 1 of 1
APPLICATION NO. : 10/261828
DATED             : November 4, 2008
INVENTOR(S)       : Satyendra Yadav It is certified that error appears in the above-identified patent and that said Letters Patent is hereby corrected as shown below:

Column 8, line 3, the word "sewer" should read -- server --;
Column 8, line 6, the word "sewer" should read -- server --;
Column 8, line 25, the word "server" should read -- server; --;
Column 8, line 26, the word "sewer" should read -- server --;
Column 8, line 3, the word "agent" should read -- agent; --;
Column 9, line 16, the word "tool" should read -- tool; --;
Column 10, line 8, the word "9" should read -- 9, --.

Signed and Sealed this

Sixteenth Day of June, 2009

JOHN DOLL
*Acting Director of the United States Patent and Trademark Office*